Sept. 30, 1958 J. M. BOYD ET AL 2,854,039
APPARATUS FOR MINIMIZING AIR CONTENT
IN CANNED CARBONATED BEVERAGES
Filed Oct. 22, 1954 2 Sheets-Sheet 1

INVENTORS
JOHN M. BOYD
HENRY F. KLOC
BY Mason, Porter, Diller & Stewart
ATTORNEYS Sept. 30, 1958  J. M. BOYD ET AL  2,854,039
APPARATUS FOR MINIMIZING AIR CONTENT
IN CANNED CARBONATED BEVERAGES
Filed Oct. 22, 1954  2 Sheets-Sheet 2

INVENTORS
JOHN M. BOYD
HENRY F. KLOC

United States Patent Office 2,854,039
Patented Sept. 30, 1958

2,854,039

APPARATUS FOR MINIMIZING AIR CONTENT IN CANNED CARBONATED BEVERAGES

John M. Boyd, Chicago, and Henry F. Kloc, Westchester, Ill., assignors to Continental Can Company, Inc., New York, N. Y., a corporation of New York Application October 22, 1954, Serial No. 464,136

3 Claims. (Cl. 141—70)

The invention relates to the packaging of carbonated beverages in cans and is particularly adapted for the canning of beer.

It is well known that air in canned beer is very undesirable. The air in the head space of the can has to a large extent been eliminated by subjecting the beer in the can to a jet of beer or a jet of $CO_2$ gas which penetrates the beer sufficiently to agitate the same and cause small bubbles containing $CO_2$ gas to be released and crowd the air out of the head space. During high pressure filling, several large bubbles are often formed containing air, which bubbles remain on the surface of the beer. The foaming of the beer to eliminate air from the head space does not destroy the large bubbles which remain in or on the surface of the foam. Attempts to eliminate these bubbles have been made employing a flame, superheated steam and other hot gases. In each instance, high temperatures have been depended upon to expand the air in the large bubbles for rupturing the same.

With carbonated beverages containing protein or protein degradation products, an excessive amount of heat is undesirable as it can result in denaturization of the protein material in the surface layer of the product which may result in destabilization leading to a cloudy product.

An object of the present invention is to provide a method of eliminating these large bubbles containing air by suitable control of jets of cold gas, such as $CO_2$ gas, projected against the bubbles for bursting the same.

Another object of the invention is to provide a method of the above type wherein the number of jets and the velocity of the same are so controlled that the bursting of the bubbles may be accomplished while excessive spillage is avoided and a creamy foam developed, free from air, filling the head space.

A still further object of the invention is to provide an apparatus for carrying out the above method which apparatus includes a jetting head having a multitude of jet forming orifices, each of which is readily accessible for cleaning.

A further object of the invention is to provide an apparatus including a jetting head of the above type which is disposed above and at right angles to the path of movement of a conveyor on which the cans are continuously passed one after another beneath said head.

A still further object of the invention is to provide an apparatus of the above type wherein the jetting head is mounted on a supporting bracket so that it may swing away from its normal position if contacted by a can on the conveyor.

These and other objects will in part be obvious and will in part be hereinafter more fully disclosed.

In the drawings which show by way of illustration one embodiment of an apparatus in carrying out the method:

Figure 1:
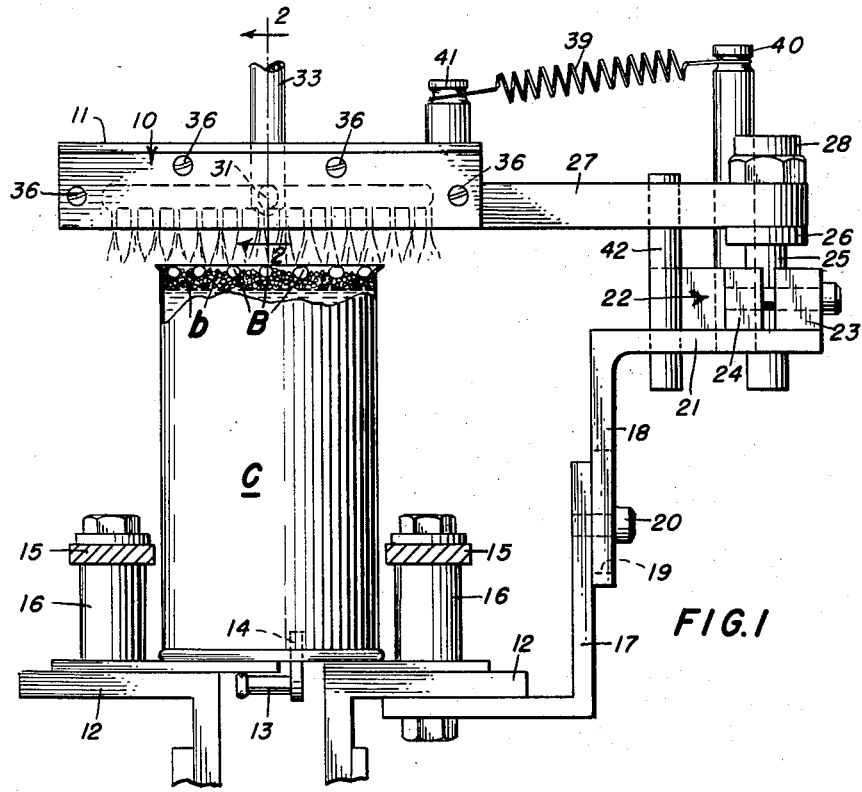
Figure 1 is a view in side elevation showing a can passing beneath a spray head embodying the improvements.

The present method of eliminating the air contained in these large bubbles consists in subjecting the bubbles to cold $CO_2$ gas at a velocity sufficient to rupture the bubbles and permit the entrapped air to escape to the atmosphere. The jets of $CO_2$ gas may be at approximately room temperature as it is a contact of the jet against the outer surface of the large bubble that ruptures the bubbles and not the expanding of the gases within the bubbles. The velocity of the jets should not be such as to cause excessive spillage. It has been found that a pressure gas supply of from 4 to 6 p. s. i. will break the bubbles without causing excessive spillage. The jets should be of such number and arrangement as to subject the entire head space area to the jets as the cans pass one after another beneath the jets. These jets of $CO_2$ gas do not affect the small bubbles formed from the beer by agitating the surface thereof but on the contrary will churn the foam and release any air entrapped therein and will also react on the surface of the beer to release very small bubbles containing $CO_2$ gas and thus there is created a creamy foam, free from air, filling the entire head space.

The apparatus as illustrated for carrying out the method includes a jetting head mounted on a standard at one side of a conveyor feeding the cans one after another to a closing machine where a cover is applied and double seamed to the can body.

The jetting head 10 includes an elongated block 11, preferably of stainless steel. The conveyor as illustrated includes supporting plates 12, 12 which are spaced from each other and traveling between the spaced plates is a conveyor chain 13 carrying spaced feed dogs 14 which engage the cans and slide them along the conveyor. There are guide rails 15, 15 mounted on standards 16, 16 which guide rails extend along the conveyor for guiding the cans. Preferably, this conveyor leads directly to the closing machine, not shown, wherein the ends are applied and double seamed to the container body.

The cans are indicated at C in Figure 1 and the can wall is broken away to show in broken lines the level of the beer in the can and above the surface of the beer there is indicated small bubbles b and large bubbles B. It is these large bubbles which are formed during the filling of the can that contain the ojectionable air.

Mounted at one side of the conveyor is an angle member 17 and secured to the upstanding leg of this angle member is another angle member 18 which is provided with a slot 19 by which a bolt 20 secures the upper angle member in vertically adjusted position on the angle member 17. Mounted on the upper leg 21 of the angle member 18 is a plate 22 having clamping jaws 23 and 24 between which is clamped a standard 25. This standard may be adjusted vertically in the clamping jaws. Mounted on the standard 25 is a collar 26. The center block 11 of the jetting head is carried by an arm 27 which is integral with the block and this arm has an opening at its outer end which is adapted to be placed on the standard with the arm resting on the collar 26. A nut 28 holds the arm in a horizontal position but the arm is free to oscillate on this standard.

Figure 2:
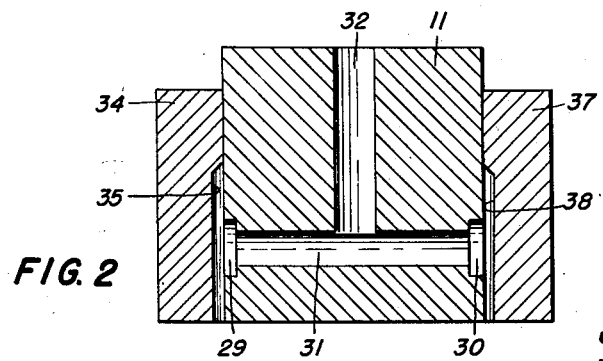
Figure 2 is a sectional view on the line 2,2 of Figure 1.
Figure 3:
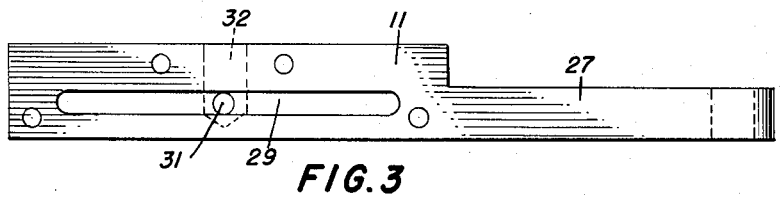
Figure 3 is a side view of the center block of the jetting head.
Figure 4:
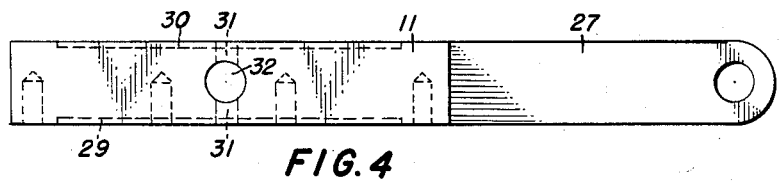
Figure 4 is a plan view of the same.
Figure 5:
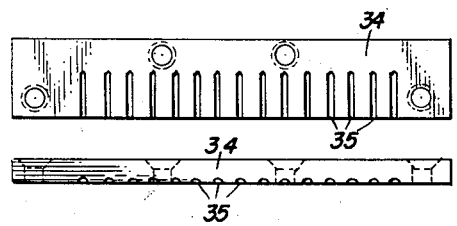
Figure 5 is an inside view of one of the plates which is attached to the center block and showing the channels for forming the jets.
Figure 6:
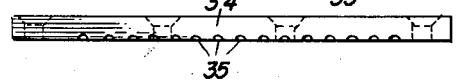
Figure 6 is a plan view of the plate shown in Figure 5.
Figure 7:
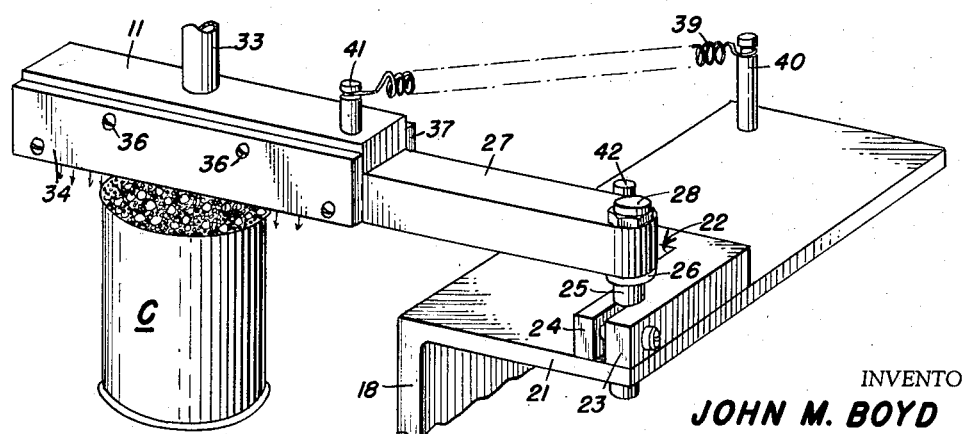
Figure 7 is a perspective view showing the mounting of the spray head with a can beneath the head.

The center block has a manifold recess 29 extending longitudinally of the block. On the opposite side of the block is a similar manifold recess 30. See Fig 2.

There is a bore 31 extending through the block and connected to the two manifolds 29 and 30. There is also a vertical bore 32 connecting with the horizontal bore 31. A flexible pipe 33 is threaded into this vertical bore and serves as a means for supplying $CO_2$ gas to the manifolds 29 and 30.

There is a plate 34 having spaced vertical channels or grooves 35 therein. These channels extend all the way to the lower side of the plate but terminate short of the upper side of the plate. The plate is secured by suitable screws 36, 36 to the center block 11 with the grooves facing against the block. These grooves cross the manifold 29.

There is a second plate 37 secured to the other side of the center block 11 which has similar channels or grooves 38 open at the lower side of the plate which cross the manifold 30. The $CO_2$ gas passes from the manifolds to these jetting nozzles formed by the grooves 35 and 38 and issues therefrom in jets. The jetting head extends across the conveyor substantially at right angles to the path of movement of the cans and these jets issuing from the jetting head will spread out and contact the entire area across the head space of the can and as the can moves below the jetting head the jets will progressively contact the entire area of the head space. The $CO_2$ gas is delivered to the jetting head under sufficient pressure to give to the jets sufficient force when they contact these bubbles containing air to rupture the bubble and permit the air therein to escape to the atmosphere. The small bubbles formed from the beer will not be broken but they will be churned about by contact of the jets so as to release any air entrapped in the foam adjacent the surface thereof. These jets will also react upon the surface of the beer so as to release further small bubbles of $CO_2$ gas with the result that the entire head space is filled with a creamy mass of foam which is free from air. Inasmuch as the can after passing the jetting head enters immediately the closing machine, the cover will be applied and contact the foam and when the cover is double seamed to the can the can will be sealed with no appreciable air therein which might affect the flavor of the beer.

The jetting head is free to swing on the standard 25. There is a spring 39 attached at one end to a post 40 carried by the arm 21. The other end of the spring is attached to a post 41 and rigidly fixed to the jetting head. There is a stop pin 42 mounted on plate 22. The spring 39 swings the jetting head until the arm 27 contacts the pin 42. In this position the jetting head will be disposed over the conveyor and at right angles thereto. If, for any reason, the can is raised from the conveyor so as to contact the head, the head will swing to one side of the conveyor without clogging or damaging in any way the jetting head.

It is obvious that changes may be made in the method and apparatus for carrying out the method so long as the jets are projected against the bubbles with sufficient force so as to rupture the same.

We claim:

1. An apparatus for eliminating air entrapped in bubbles on the surface of a carbonated beverage during filling comprising a filled can conveying means, a jetting head disposed above and at right angles to the path of travel of the cans, said jetting head including a center block having a recess manifold extending lengthwise of and opening laterally through one side face of the block and a plate secured to said side face and covering said manifold, said plate having vertically extending grooves extending through the inner face thereof for communication with the recess manifold at closely spaced intervals across said manifold and opening through the under side of the jetting head, said center block having ports for directing gas to said manifold and from said openings in jets into the head space area of a passing can for bursting the bubbles therein containing air.

2. An apparatus for eliminating air entrapped in bubbles on the surface of a carbonated beverage during filling comprising a filled can conveying means, a jetting head disposed above and at right angles to the path of travel of the cans, said jetting head including a center block having a recess manifold extending lengthwise of and opening laterally through each side face of the center block, and a plate secured to each side face of the block and covering the recess manifold in the particular block face, each plate having vertically extending grooves extending through the block opposing inner face thereof and opening into the respective recess manifold at closely spaced intervals across said manifold and open at the underside of said head, said center block having ports for directing gas to said manifolds and from said openings in jets into the headspace area of a passing can for bursting the bubbles therein containing air.

3. An apparatus for eliminating air entrapped in bubbles on the surface of a carbonated beverage during filling comprising a filled can conveying means, a jetting head disposed above and at right angles to the path of travel of the cans, a standard at one side of the conveyor on which said head is mounted to swing horizontally to and from normal jetting position, a stop for locating said head in jetting position and a spring for yieldingly holding said head in contact with said stop, said stop and spring being disposed so that said head may swing if struck by a can to permit the can to pass.

References Cited in the file of this patent

UNITED STATES PATENTS

| 1,406,380 | Heath et al. | Feb. 14, 1922 |
| 2,054,492 | Young | Sept. 15, 1936 |
| 2,333,898 | Stevenson et al. | Nov. 9, 1943 |
| 2,356,498 | Bargeboer | Aug. 22, 1944 |
| 2,672,420 | Jeremiah | Mar. 16, 1954 |